(12) United States Patent
Johnson et al.

(10) Patent No.: US 7,109,963 B2
(45) Date of Patent: Sep. 19, 2006

(54) DISPLAY DEVICE

(75) Inventors: Mark Thomas Johnson, Eindhoven (NL); Tore Nauta, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 376 days.

(21) Appl. No.: 10/075,311

(22) Filed: Feb. 14, 2002

(65) Prior Publication Data

US 2002/0149574 A1    Oct. 17, 2002

(30) Foreign Application Priority Data

Feb. 16, 2001   (EP) .................................. 01200558

(51) Int. Cl.
*G09G 3/36*    (2006.01)
(52) U.S. Cl. ........................................ 345/94
(58) Field of Classification Search .............. 345/92, 345/94, 87, 101, 98, 102; 349/38, 39; 315/169.3
See application file for complete search history.

(56) References Cited

U.S. PATENT DOCUMENTS 5,247,194 A * 9/1993 Bae et al. ..................... 257/59
5,461,397 A * 10/1995 Zhang et al. ................ 345/102
5,508,591 A * 4/1996 Kanemori et al. ......... 315/169.3
6,075,506 A * 6/2000 Bonnett et al. ............... 345/89
6,232,944 B1 * 5/2001 Kumagawa et al. .......... 345/98
6,504,522 B1 * 1/2003 Shiraki et al. ................ 345/98

FOREIGN PATENT DOCUMENTS

EP    0588019 A2    7/1993
EP    0652546 A1    10/1994

OTHER PUBLICATIONS

Patent Abstracts of Japan; vol. 010, No. 206, (p. 478), Jul. 18, 1986, JP61047933A.

* cited by examiner

*Primary Examiner*—Richard Hjerpe
*Assistant Examiner*—Kevin M. Nguyen

(57) ABSTRACT

The response of the last addressed lines in a pulsed backlight LCD is enhanced by introducing overdrive at these last lines, for instance, via capacitive coupling or by means of a temperature gradient.

20 Claims, 4 Drawing Sheets

FIG. 4A [Prior Art]

DISPLAY DEVICE

The invention relates to a liquid crystal display device comprising a pixel and at least one switching element at the area of a matrix of selection electrodes, or row electrodes, and data electrodes, or column electrodes, and drive means for driving the selection electrodes and the data electrodes.

Examples of such an active matrix display device are the TFT-LCDs or AM-LCDs which are used in video applications or digital monitors.

A problem in such display devices is the occurrence of motion artefacts such as motion blur. A movement within an image is vaguely displayed because the liquid crystal material requires a minimal time to reach a given final state defined by the drive voltages, which has a very irritating effect. This is obviated in practice by making use of a pulsed backlight system in which, within a frame period, the full image is first addressed and, after the last picture line has been addressed, the light source is caused to emit a short intense light pulse.

However, in this case the problem occurs that the pixels associated with the picture line addressed as the first line have had a longer time to reach a stable final state than the picture lines addressed at a later stage. This results in a reduced picture quality from the picture line addressed as the first line towards the picture line addressed as the last line.

It is an object of the present invention to provide a display device of the type described in the opening paragraph, in which motion artefacts such as motion blur do not occur or hardly occur.

To this end, a display device according to the invention comprises a pulsed backlight system and further means for increasing the switching rate of pixels in the sequence of selecting the pixels during operation.

The invention is based on the recognition that, by giving rows of pixels driven at a later stage a higher switching rate than rows of pixels driven at an earlier stage, a kind of gradual compensation takes place, so that said motion blur is considerably reduced.

This can be achieved, for example, by means of a signal processor by increasing the range of (possible) drive voltages (for example, via the data voltages) across the pixels (increasing "overdrive") in the sequence of driving the rows of pixels. A picture memory and extra circuitry are usually necessary for this purpose.

In a preferred embodiment, a picture electrode of a pixel is capacitively coupled to a further electrode, and the further means comprise drive means for increasing the range of possible drive voltages across the pixels via the capacitive coupling.

In this application, "capacitively coupled" means that there is a coupling via an (auxiliary) capacitance (auxiliary capacitor), for example, by (partial) overlap of a picture electrode associated with a row and a part of the row electrode (selection electrode) associated with a subsequent (or previous) row. The (increasing) "overdrive" is generated via the auxiliary capacitors.

The range of drive voltages across the picture electrodes can now be increased, for example, by presenting a voltage, varying with the location, to the capacitances associated with a row of pixels, just before or just after presenting the data for this row of pixels. However, this requires extra connections (maximally a number which is equal to the number of rows). It is alternatively possible to provide a voltage gradient across counter plates of the capacitances associated with a row of pixels.

In a preferred embodiment, the drive means apply drive voltages across the pixels via a capacitive coupling with a juxtaposed selection electrode, at which the capacitances of the storage capacitors increase or decrease in the sequence of selecting the pixels.

Finally, it is possible to generate a temperature gradient during operation, at which the temperature increases in the direction of the sequence of selecting the pixels. Due to the higher temperature, the last-driven pixels switch at a faster rate and the effect of motion blur is counteracted.

These and other aspects of the invention are apparent from and will be elucidated with reference to the embodiments described hereinafter.

In the drawings:

FIG. 1 is an electric circuit diagram of the display device, while

FIGS. 4A–4B illustrate example timing diagrams.

The Figures are diagrammatic and not drawn to scale. Corresponding parts are generally denoted by the same reference numerals.

Figure 1:
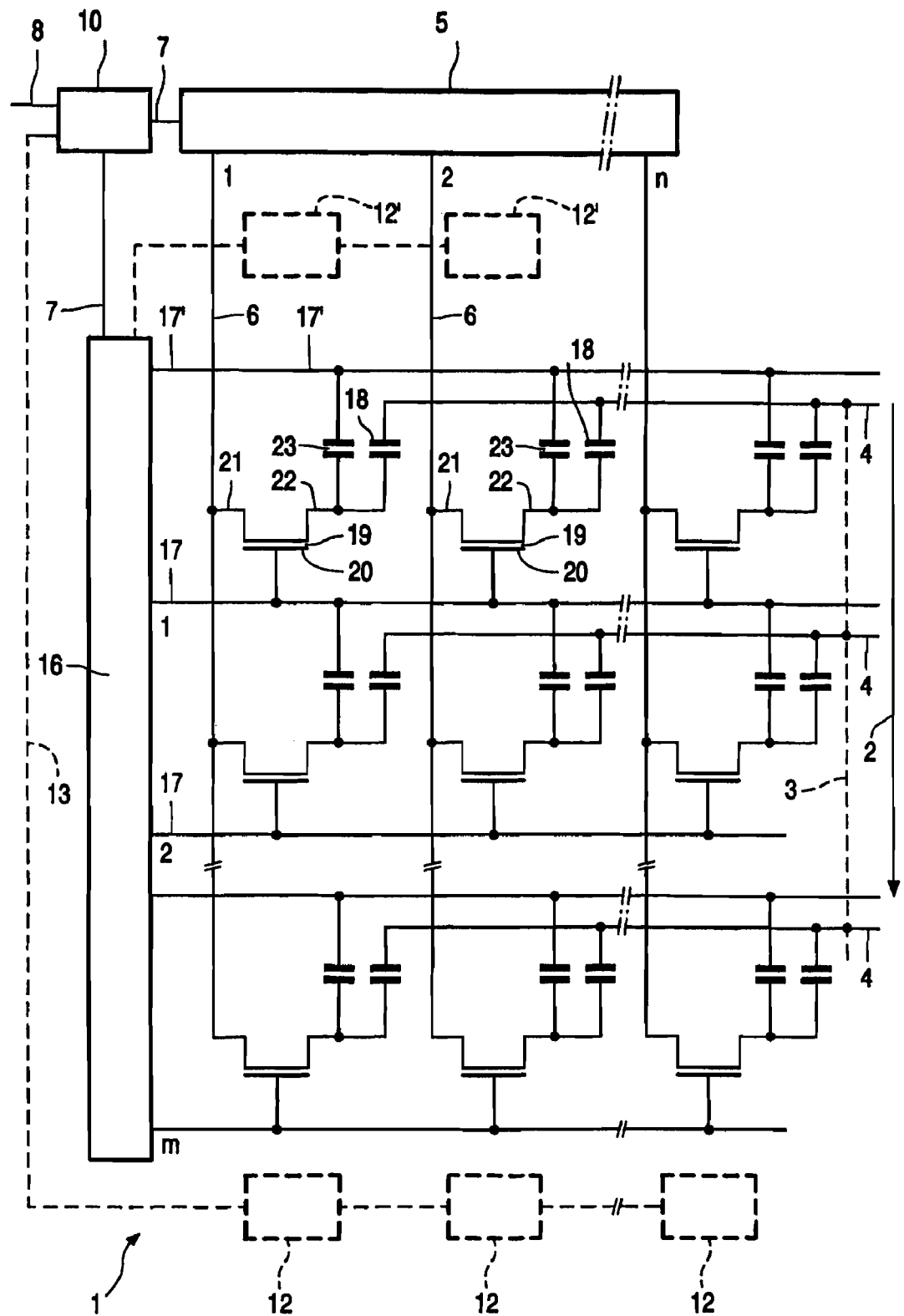

FIG. 1 is an electric equivalent of a part of a display device 1 to which the invention is applicable. It comprises a matrix of pixels 18 at the area of crossings of row or selection electrodes 17 and column or data electrodes 6. The row electrodes 1 to m are consecutively selected by means of a row driver 16, while the column electrodes 1 to n are provided with data via a data register 5. To this end, incoming data 8 are first processed, if necessary, in a processor 10. Mutual synchronization between the row driver 16 and the data register 5 takes place via drive lines 7.

Figure 4B:
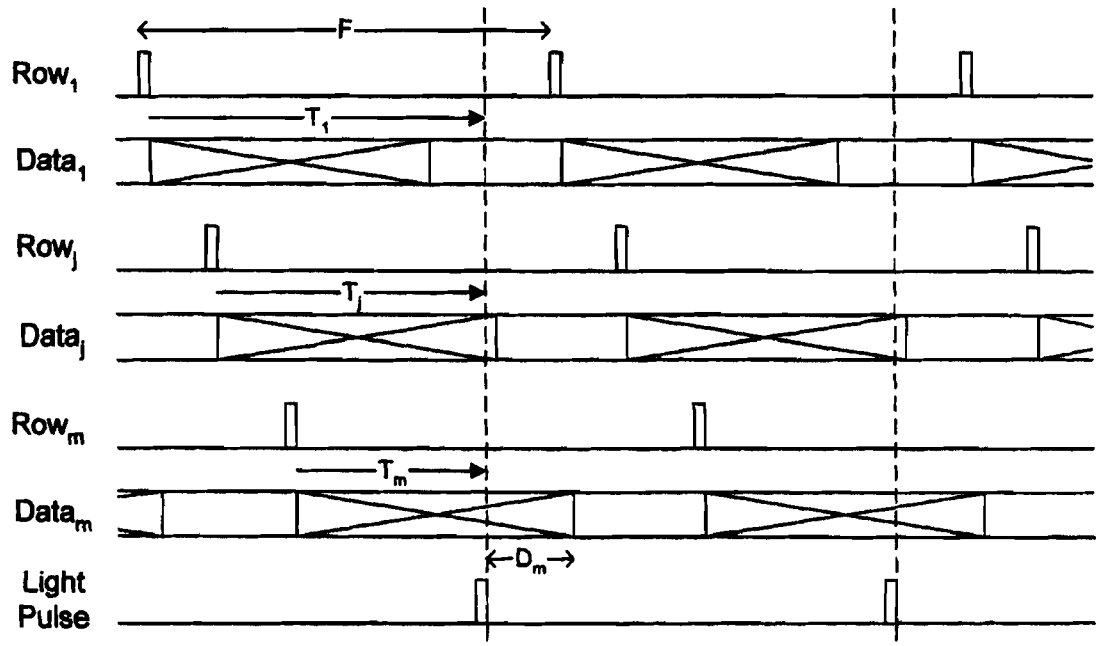
Figure 4B:
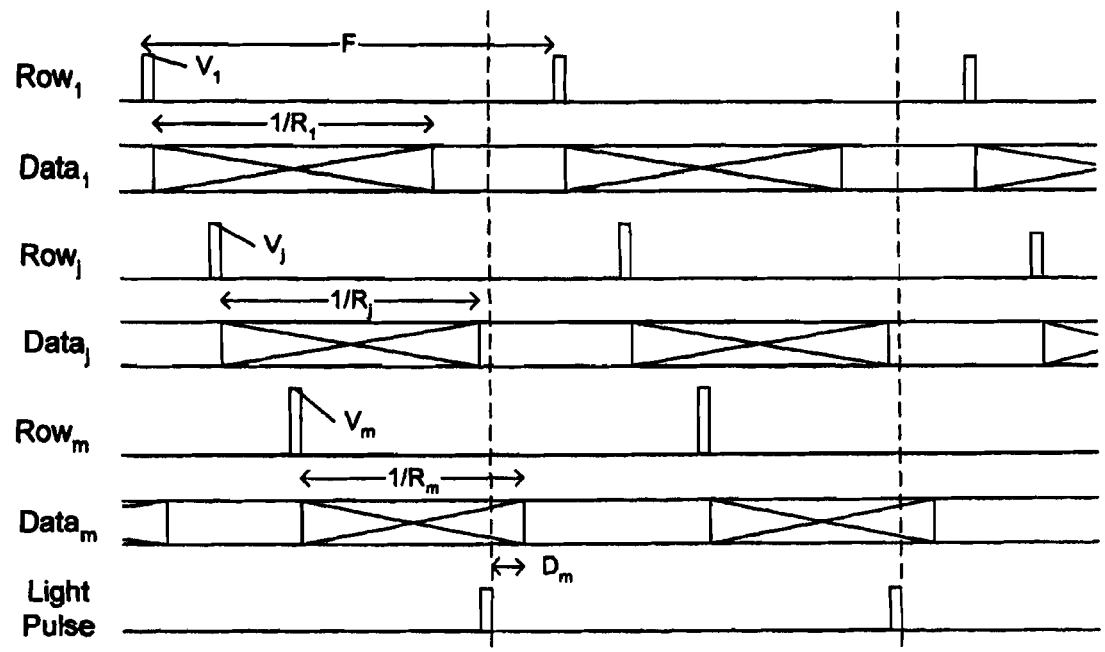

Drive signals from the row driver 16 select the picture electrodes via thin-film transistors (TFTs) 19, whose gate electrodes 20 are electrically connected to the row electrodes 17 and whose source electrodes 21 are electrically connected to the column electrodes. The signal at the column electrode 6 is transferred via the TFT to a picture electrode, coupled to the drain electrode 22, of a pixel 18. The other picture electrodes are connected, for example, to one (or more) common counter electrode(s) via connection lines As stated in the opening paragraph, the full picture is first addressed (Row signals $Row_1, \ldots Row_j, \ldots Row_m$ in FIGS. 4A, 4B) within a frame period (F in FIGS. 4A, 4B) when a pulsed backlight system is used, and after the last picture line ($Row_m$ in FIGS. 4A, 4B) has been addressed, a short intense light pulse is emitted by a light source Light Pulse in FIGS. 4A, 4B).

However, in this case the problem occurs that the pixels associated with the first addressed picture lines (lines 1, 2 if the picture lines are selected in the direction of the arrow 2, i.e. the row electrodes 17 are consecutively selected in the direction of the arrow 2) have had a longer time ($T_1$ in FIG. 4A) to reach a stable final state than the picture lines addressed at a later stage (m-1, m) ($T_m$ in FIG. 4A). This results in a reduced picture quality in the direction from the picture line addressed as the first line towards the picture line addressed as the last line, because, as noted above, the later-selected lines have not had as much time as the earlier-selected lines to reach their stable final state.

Since the switching rate of pixels increases with an increasing voltage across the pixels, the drive voltage across the pixels can be adapted (for example, via the data voltages) by means of a signal processor in the sequence of driving the rows of pixels, for example, by increasing the voltage step (the range of drive voltages) for pixels that have been selected at a later stage. A picture memory and extra circuitry are usually necessary for this purpose.

In this embodiment, the display device of FIG. 1 also comprises an auxiliary capacitor 23 at the location of each pixel. In this embodiment, the auxiliary capacitor is connected between the common point of the drain electrode 22 and the display element in a given row of pixels, on the one hand, and the row electrode of the previous row of pixels, on the other hand. Other configurations are alternatively possible, for example, between said common point and the next row of pixels, or between this point and an electrode (indicated by means of the broken line 3) for a fixed or a variable voltage.

To prevent picture deviations, the display device comprises an extra row electrode 17'.

Also in this case, the range of drive voltages across the pixels can be increased (for example, via the data voltages) again by means of, for example, a signal processor in the sequence of selection, i.e. the sequence of driving the rows of pixels, so that a larger voltage step is obtained. A picture memory and extra circuitry are usually necessary for this purpose. However, the range of drive voltages across the pixels can be increased by giving the voltage across the connection lines 4 a higher voltage step in the direction of the arrow 2 (continuously or not continuously increasing).

Preferably however, the capacitances of the storage capacitors (auxiliary capacitances) 23 increase in the sequence of driving the rows (in the direction of the arrow 2).

Figure 2:
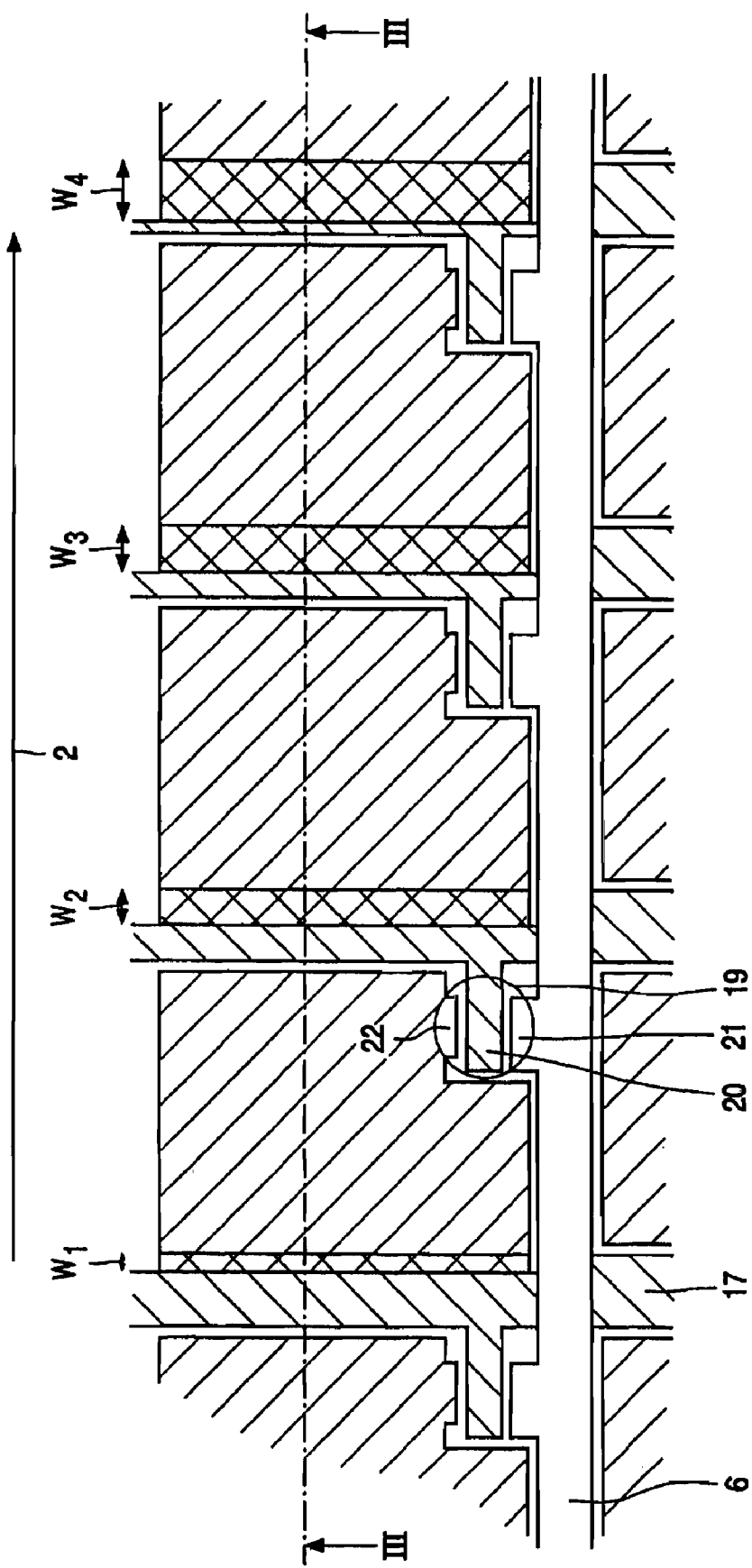
FIG. 2 is a plan view of a part of a display device according to the invention.
Figure 3:
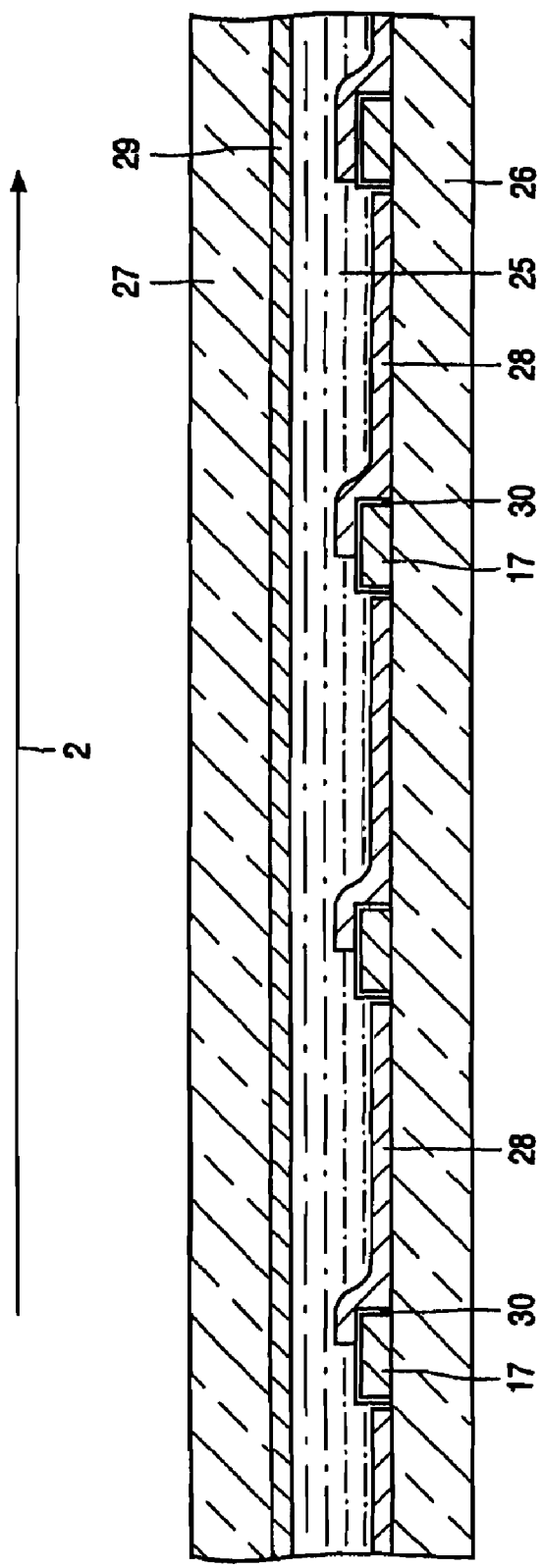
FIG. 3 is a diagrammatic cross-section of the display device The Figures are diagrammatic and not drawn to scale. Corresponding parts are generally denoted by the same reference numerals.

FIG. 2 is a plan view and FIG. 3 is a cross-section taken on the line III—III in FIG. 2 of a part of a display device with a liquid crystal material 25 which is present between two substrates 26, 27 of, for example, glass or a (flexible) synthetic material, provided with (ITO or metal) picture electrodes 28 and a counter electrode 29. Moreover, the device comprises, if necessary, orientation layers (not shown) which orient the liquid crystal material on the inner walls of the substrates. The picture electrodes 28 are electrically connected by means of thin-film transistors (TFTs) 19 to the row electrodes 17 via the gate electrodes 20 and to the column electrodes via the source electrodes 21. The drain electrodes 22 contact the picture electrodes.

The (auxiliary) capacitances (capacitors) 23 are constituted by a (partial) overlap of a picture electrode 28 associated with a row and a part of a row electrode 17 associated with a previous row, between which a dielectric layer 30 is present. The (auxiliary) capacitances 23 may be alternatively formed by (partial) overlap of a picture electrode 23 associated with a row and a part of the row electrode 17 associated with the next row, between which a dielectric layer is present.

As is apparent from FIGS. 2, 3, the extent of overlap Increases in the direction of the arrow 2. This means that the extra capacitance increases in this direction and, at the same level of the drive voltage, the capacitive coupling via the (auxiliary) capacitances 23 increases in the direction of the arrow 2. so that the pulse across the pixel ($V_1$, $V_j$, $V_m$ in FIG.4B) increases in value, with the result that the switching rate R of the pixels in rows driven at a later stage $R_m$, $R_{m-1}$. . . . will be higher than for pixels of rows driven at an earlier stage R1, R2, . . . , and a kind of compensation occurs, because the differences in time between the time of applying the light and the time completion of switching is reduced, as illustrated, for example, by the difference in the magnitude of $D_m$ in FIGS. 4A and 4B. Said motion blur is considerably reduced by this "overdrive".

Moreover, it is possible to give rows of pixels driven at a later stage a higher switching rate than rows of pixels driven at an earlier stage by raising the temperature at the location of the rows driven at a later stage with respect to the rows driven at an earlier stage, for example, by providing a temperature gradient by means of heating elements (diagrammatically denoted by the reference numerals 12, 12), and by setting the correct gradient via sensors and a feedback mechanism 11.

Although the (auxiliary) capacitors 23 increase in capacitance in the direction of the arrow 2 in this embodiment, they may also decrease in capacitance while the range of values of voltages which can be applied to the connections 4 is simultaneously increased.

The invention is of course not limited to the embodiments described above. For example, the invention may also be used for other effects used with a pulsed backlight system such as, for example, the electroscopic or electrophoretic effect. Use in switchable mirrors is alternatively possible.

A combination of one or more of said possibilities is also applicable in practice.

The protective scope of the invention is not limited to the embodiments described above.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A display device comprising:
   a pixel and at least one switching element at each area of intersection of a matrix of selection electrodes and data electrodes, and
   a first driver that is configured to drive the selection electrodes in a sequence and
   a second driver that is configured to drive the data electrodes, and
   a pulsed backlight system that applies a pulse of light at a select time after the sequence of selecting the pixels; wherein
   the display device is configured to increase a switching rate of pixels based on the sequence, so as to minimize a variance between the select time of applying the pulse of light and times that the pixels complete their switching.

2. The display device of claim 1, wherein
   the display device is configured to increase the switching rate of the pixels by increasing an applied drive voltage across the pixels based on the sequence of selecting the pixels.

3. The display device of claim 1, wherein
   a picture electrode of a pixel is capacitively coupled to a further electrode, and
   the display device is configured to increase the switching rate of the pixels by increasing an applied drive voltage across the pixels via the capacitive coupling.

4. The display device of claim 3, wherein
   the drive voltage is applied across the pixels via a capacitive coupling with a juxtaposed selection electrode.

5. The display device of claim 3, wherein
the capacitive coupling between the picture electrode and the further electrode is dependent upon the sequence of selecting the pixels.

6. The display device of claim 1, wherein
the display device is configured to increase the switching rate of the pixels by generating a temperature gradient during operation, at which the temperature increases in a direction of the sequence of selecting the pixels.

7. A display device comprising:
an array of pixels ttiat includes rows of pixels that are selected by a plurality of row drive signals,
a row driver that is configured to sequentially apply each row drive signal of the plurality of row drive signals from a first time to a second time within a frame period, each row of pixels thereby having a sequentially increasing row selection time, and
a lighting source that is configured to provide a pulse of light at a third time within the frame period,
wherein
the display device is configured such that a switching rate of each row of pixels is configured to be based on a difference between the third time and the row selection time of the row of pixels.

8. The display device of claim 7, wherein
the row driver is configured to apply sequentially larger voltage differentials to form each row drive signal from the first time to the second time within the frame period.

9. The display device of claim 8, wherein
each pixel of each row of pixels includes a capacitance that effects the switching rate of the row of pixel, and
the capacitance of the pixels of each row of pixels is based on the difference between the third time and the row selection time of the row of pixels.

10. The display device of claim 9, wherein
each capacitance is formed by an overlap of a picture electrode of the pixel and a row electrode that provides the row drive signal to a prior row of pixels, and
an amount of the overlap is based on the difference between the third time and the row selection time of the row of pixels.

11. The display device of claim 10, wherein
the display device is configured such that an operating temperature of each row of pixels is dependent upon the difference between the third time and the row selection time of the row of pixels.

12. The display device of claim 9, wherein
the display device is configured such that an operating temperature of each row of pixels is dependent upon the difference between the third time and the row selection time of the row of pixels.

13. The display device of claim 8, wherein
the display device is configured such that an operating temperature of each row of pixels is dependent upon the difference between the third time and the row selection time of the row of pixels.

14. The display device of claim 7, wherein
each pixel of each row of pixels includes a capacitance that affects the switching rate of the row of pixel, and
the capacitance of the pixels of each row of pixels is based on the difference between the third time and the row selection time of the row of pixels.

15. The display device of claim 14, wherein
each capacitance is formed by an overlap of a picture electrode of the pixel and a row electrode that provides the row drive signal to a prior row of pixels, and
an amount of the overlap is based on the difference between the third time and the row selection time of the row of pixels.

16. The display device of claim 15, wherein the display device is configured such that an operating temperature of each row of pixels is dependent upon the difference between the third time and the row selection time of the row of pixels.

17. The display device of claim 14, wherein
the display device is configured such that an operating temperature of each row of pixels is dependent upon the difference between the third time and the row selection time of the row of pixels.

18. The display device of claim 7, wherein the display device is configured such that an operating temperature of each row of pixels is dependent upon the difference between the third time and the row selection time of the row of pixels.

19. The display device of claim 18, wherein the operating temperature of each row of pixels increases as the difference between the third time and the selection time of the row of pixels decreases.

20. The display device of claim 7, wherein the switching rate of each row of pixels increases as the difference between the third time and the selection time of the row of pixels decreases.

* * * * *